March 17, 1970　　　　　E. D. LONG　　　　　3,500,803
ELECTRONIC MODULATOR CIRCUIT FOR PRECISION FUEL METERING SYSTEMS
Original Filed July 14, 1967　　　　　3 Sheets-Sheet 3
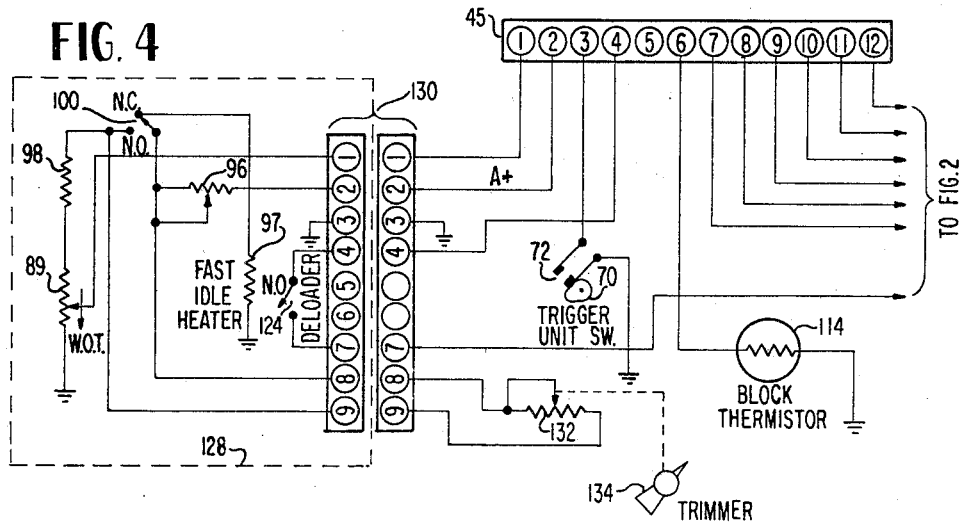
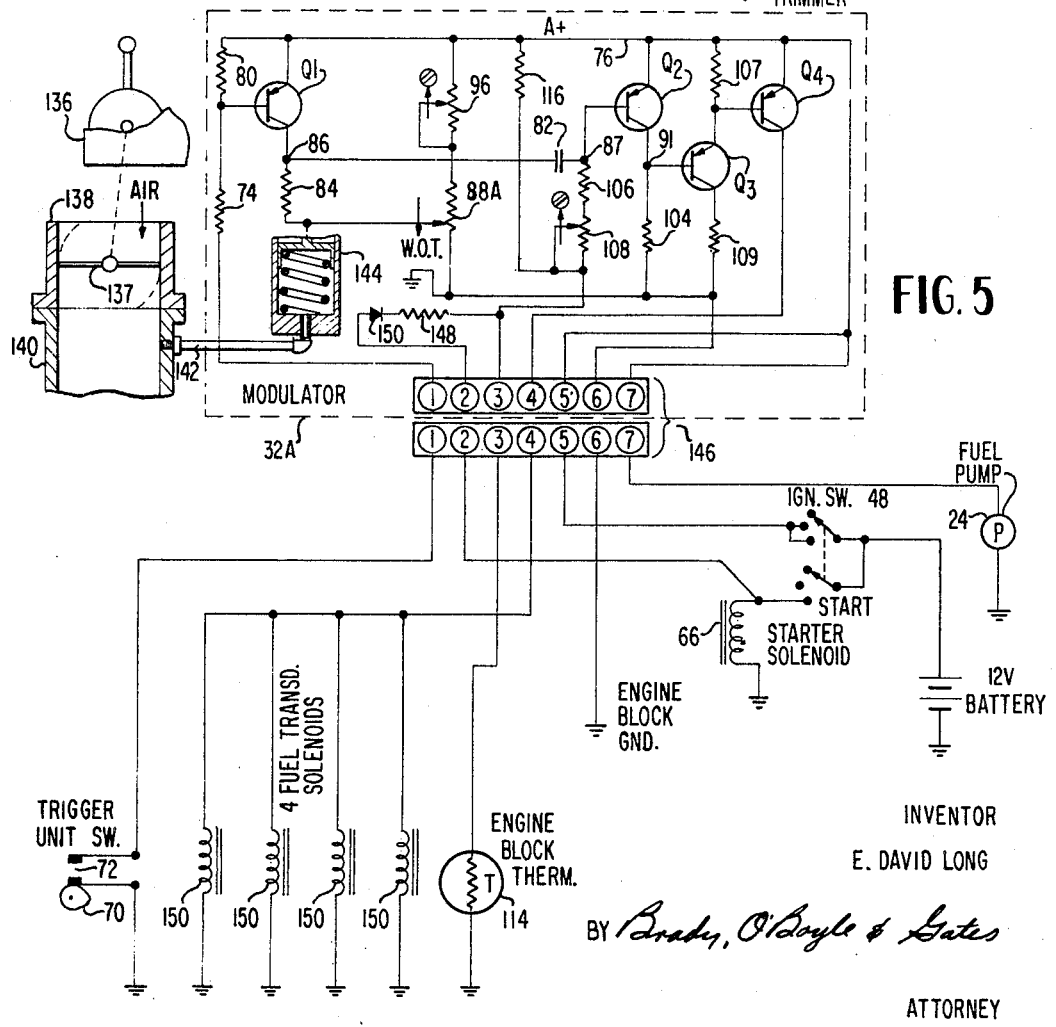
INVENTOR
E. DAVID LONG
BY Brady, O'Boyle & Gates
ATTORNEY United States Patent Office 3,500,803
Patented Mar. 17, 1970

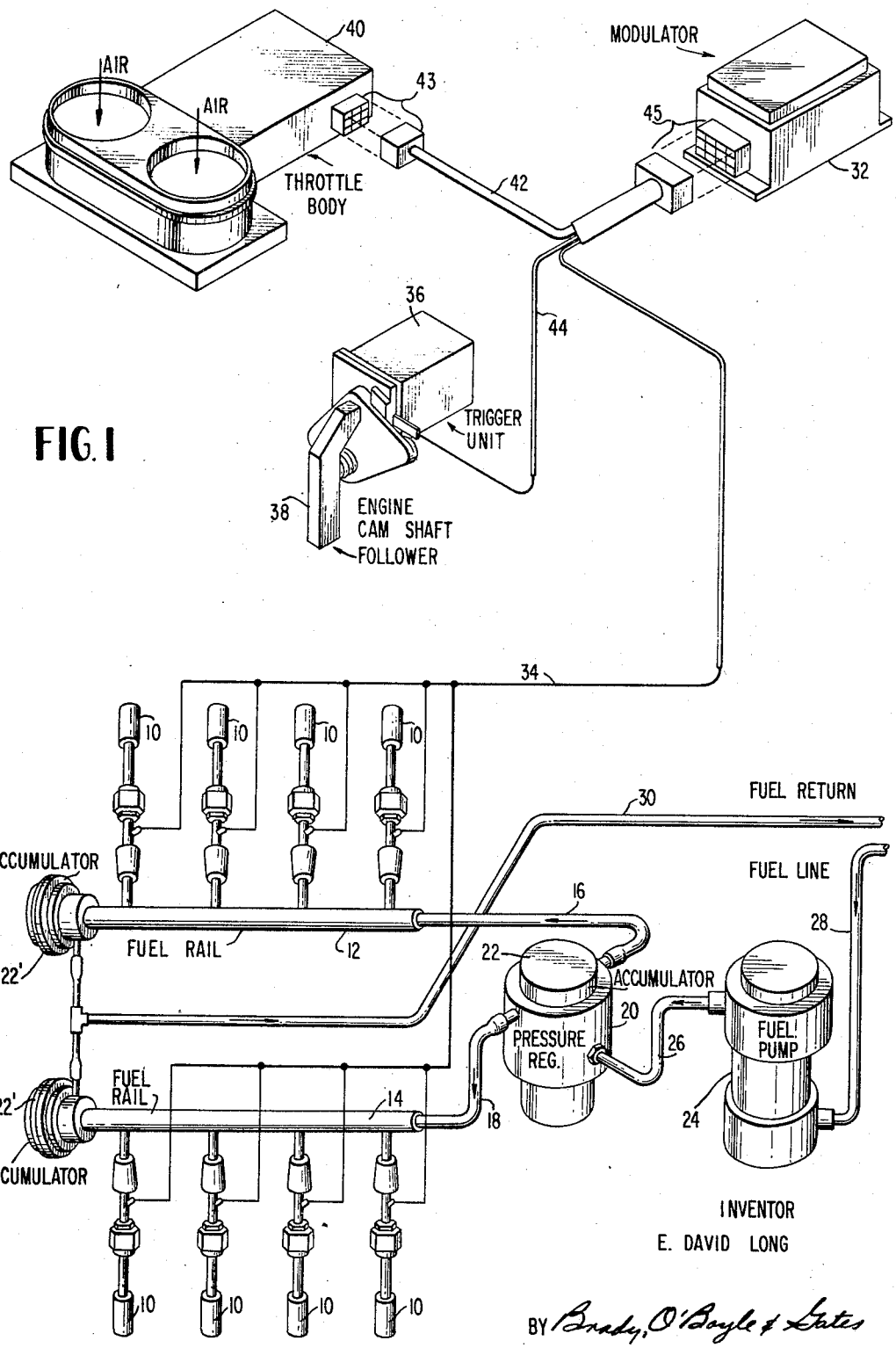
FIG. I

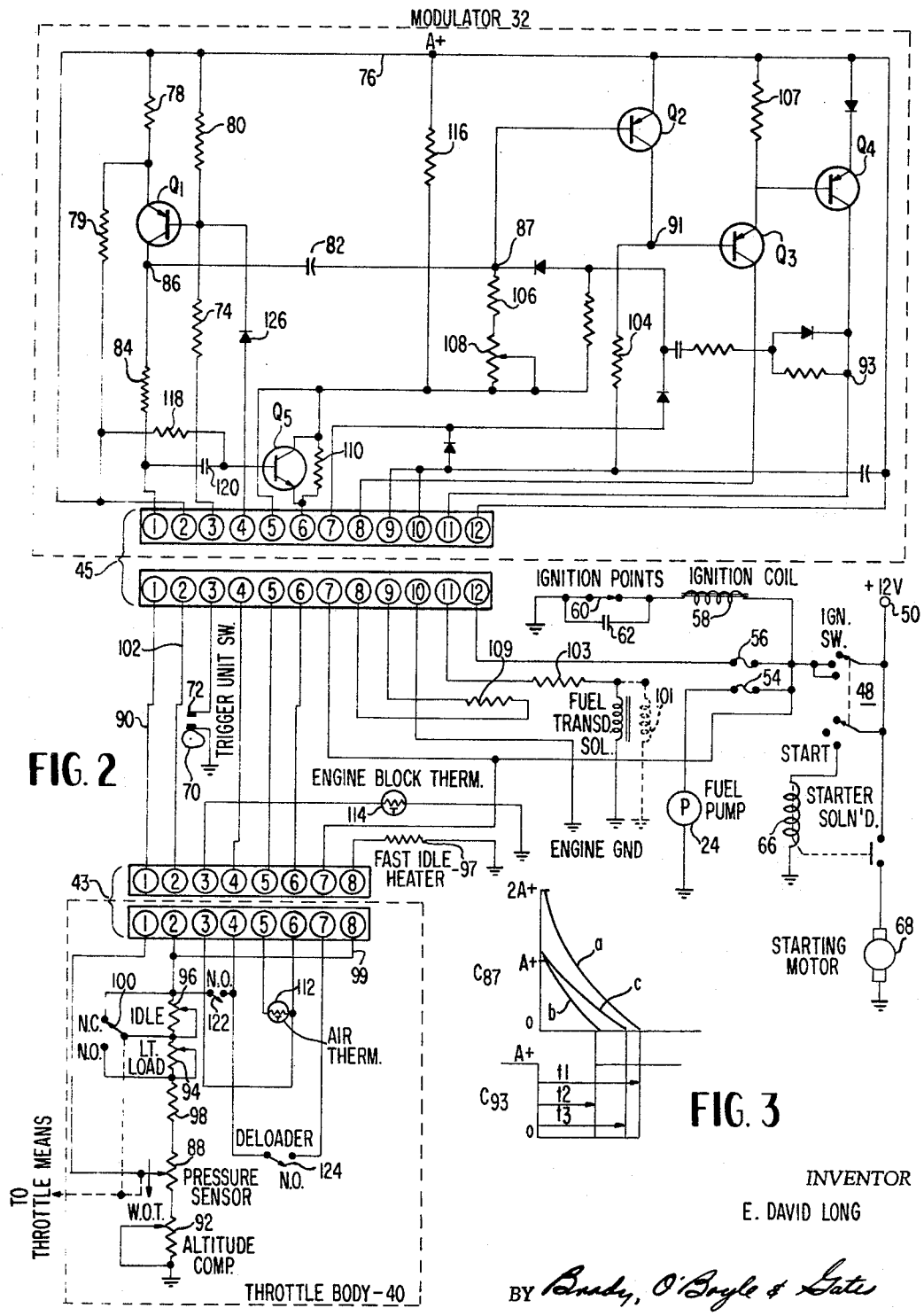

3,500,803
ELECTRONIC MODULATOR CIRCUIT FOR
PRECISION FUEL METERING SYSTEMS
Emile David Long, Elmira, N.Y., assignor to Gillett Tool
Co., Inc., Buffalo, N.Y.
Continuation of application Ser. No. 653,484, July 14,
1967. This application Feb. 19, 1969, Ser. No. 809,450
Int. Cl. F02m 15/00; F02n 5/12, 39/00
U.S. Cl. 123—32                                    13 Claims

ABSTRACT OF THE DISCLOSURE

A non-regenerative variable pulse width generator for energizing one or more fuel transducers in a precision fuel metering system in order to optimally feed a predetermined charge of fuel to respective cylinders of an internal combustion engine during each engine cycle in accordance with the length of time each transducer is energized. The length of time or pulse width is determined from continuously measured engine operating parameters such as throttle position, engine temperature, barometric pressure, et cetera.

This application is a continuation of Ser. No. 653,484, filed July 14, 1967; now abandoned.

CROSS-REFERENCE TO RELATED APPLICATIONS

The present invention is related to U.S. patent applications, Ser. No. 650,563 entitled "Precision Fuel Metering System" filed on June 13, 1967, now Patent No. 3,412,-718 and Ser. No. 645,701 entitled "Fluid Compression and Expansion Wave Converter for Precision Fuel Metering Systems" filed on June 13, 1969, both in the name of E. David Long and assigned to the assignee of the present invention.

BACKGROUND OF THE INVENTION

The present invention relates generally to electronic circuitry utilized for energizing fuel metering transducers disposed adjacent the inlet valves of internal combustion engines for feeding a controlled amount of fuel to the engine for a predetermined length of time during each engine cycle. More particularly, the present invention is directed to non-regenerative electronic modulator means for generating an energizing pulse for fuel metering transducers, the duration of which is regulated as a function of engine operating conditions.

It has heretofore been known to generate variable width energizing pulses for fuel injector valves by means of a monostable multivibrator which is triggered as a function of engine speed to produce electrical pulses of controlled time duration to either successively or simultaneously energize a plurality of fuel valves of a fuel injection system. For example, U.S. Patent 3,032,025 entitled "Fuel Supply System" issued to E. D. Long et al., the present inventor, discloses this type of apparatus.

SUMMARY OF THE INVENTION

The present invention is comprised of a non-regenerative modulator circuit for precision fuel metering systems utilized in combination with an internal combustion engine and includes capacitive means having a charge circuit whose time constant is responsive to a vacuum pressure transducer which is responsive to the engine throttle and a discharge circuit which is triggered in synchronism with engine speed and having a time constant which is a function of other engine operating conditions as well as the position of the vacuum pressure transducer for providing a variable pulse width energizing pulse for simultaneously operating a plurality of fuel transducers. Additionally, normally closed switch means is shunted across a portion of the discharge circuit and is opened for a predetermined time whenever the engine throttle is moved so as to accelerate the engine. The discharge time constant, in turn, is increased thereby, increasing the pulse width of the energizing pulse.

BRIEF DESCRIPTION OF THE DRAWINGS

FIGURE 1 is a schematic representation of a precision fuel metering system embodying the subject invention;

FIGURE 2 is an electrical circuit diagram of one embodiment of the subject invention;

FIGURE 3 is a diagram of illustrative waveforms helpful in understanding the operation of the subject invention;

FIGURE 4 is a partial circuit diagram of another configuration of control elements used in combination with the subject invention; and FIGURE 5 is an electrical circuit diagram of a second embodiment of the subject invention.

DESCRIPTION OF THE PREFERRED EMBODIMENTS

Referring now to the drawings and more particularly to FIGURE 1, reference numeral 10 designates a plurality (8) of fuel metering transducers coupled to a pair of fuel rails 12 and 14, with each rail feeding four equally spaced transducers. The fuel rails 12 and 14 are respectively fed from fuel lines 16 and 18 coupled to a fuel pressure regulator 20 having an accumulator 22 mated thereto. Second accumulator means 22' is separately coupled to the other end of the fuel rails 12 and 14. The details of the accumulators 22 and 22' is described in the above related application entitled "Accumulator Means for Precision Fuel Metering Systems." The pressure regulator 20 is coupled to a fuel pump 24 by means of a fuel line 26. The fuel pump is fed from a fuel source, not shown, by means of the fuel line 28. A return fuel line 30 is coupled to the outputs of the two accumulators 22' providing a closed system for feeding each cylinder individually with a predetermined amount of fuel from its respective fuel transducer 10.

Each of the fuel transducers 10 are simultaneously energized by means of an electronic modulator circuit 32. An energizing pulse generated by the modulator circuit 32 is coupled to the transducers 10 by means of wire lead 34. The energizing pulse is generated once per engine cycle in response to a trigger pulse coupled to the modulator 32 from a trigger unit 36 which is mechanically actuated once per engine cycle and therefore as a function of speed by means of a camshaft follower 38 driven by the engine camshaft, not shown.

Sensors, not shown, comprising resistive elements such as thermistors, potentiometers and rheostats, and switching components which are responsive to various engine operating conditions are mounted in the throttle body 40 and are electrically coupled to the modulator 32 by means of connectors 43 and 45, and cable 42 to vary the pulse width or time duration of the energizing pulse coupled to the wire 34.

Considering now the modulator unit 32 and the throttle body 40 in greater detail, reference is made to FIGURE 2 wherein the electrical circuit diagram for a first embodiment of these units is shown in combination with the electrical system for an internal combustion engine adapted for use with the subject invention. Electric power (+12 v.) from a battery, not shown, is coupled to terminal 50 and is supplied to the system by closing the ignition switch 48. The closing of the ignition switch 48 immediately energizes the fuel pump 24 through the fuse 54 and supplies power to the modulator unit 32 and the throttle body 40 by means of fuse 56 and contacts 12 and 2, respectively, of connector 45. Additionally, the ignition switch 48 feeds the +12 v. battery voltage to ignition coil 58 which is coupled in series to the parallel combination of the ignition points 60 and firing condenser 62. By closing the starting switch contacts of switch 48, the starter solenoid 66 is energized, closing a circuit connecting the starter motor 68 to terminal 50. It should be observed that in the present arrangement, electrical power is supplied to the fuel pump 24 and to the throttle body 40 and modulator 32 prior to energizing the starting motor 68.

As the starting motor 68 turns, the cam 70 rotates closing the trigger unit switch contacts 72 of the trigger unit 36. The contacts 72 are coupled to the base of transistor $Q_1$ through contacts 3 of connector 45 and resistor 74. Transistor $Q_1$ is shown in the present embodiment as being a P-N-P transistor whose emitter is coupled to a positive (A+) supply bus 76 by means of resistor 76. A resistor 80 is connected from the A+ supply bus 76 to the base of transistor $Q_1$ and upon closure of the switch contacts 72, the base of transistor $Q_1$ is properly biased and is fed a base current sufficient to render transistor $Q_1$ conductive in a saturated mode of operation, providing a relatively small resistance thereby. Transistor $Q_1$ simply acts as a second switch acting in combination with the trigger switch unit 36 and remains closed as long as switch contacts 72 remain closed due to the action of the cam 70. In the instant invention, the switch contacts 72, for example, are adjusted to remain closed for 80% of the engine cycle while being opened for 20% of the cycle.

The collector of transistor $Q_1$ is commonly connected to one side of capacitor 82 and resistor 84 forming a junction 86. The opposite end of resistor 84 is coupled to the movable contact member or wiper of potentiometer 88 located in the throttle body unit 40 by means of connector contacts 1 of connectors 43 and 45 and circuit lead 90. Potentiometer 88 is a specially designed resistance whose wiper contact is mechanically driven in response to throttle actuation. For example, the wiper arm may be mechanically driven by a vacuum actuated piston with a calibrated spring located adjacent the intake manifold of the engine. The resistive characteristic of potentiometer 88 is selectively chosen to provide an electrical analog of the optimum fuel requirements per engine cycle for a given induction passage absolute pressure where absolute pressure is used for basic metering control. It may therefore be designated a pressure sensitive potentiometer. The electrical characteristic is non-linear and compromises a composite curve determined both analytically and experimentally of the relationships relating to fuel/air mix ratio vs. load, fuel flow in pounds per hour vs. desired modulator pulse width, and control voltage vs. modulator pulse width. In all cases, it is desirable that a fuel charge comprising a substantially stoichiometric mix is supplied to each of the cylinders per engine cycle under dynamic operating conditions.

The pressure sensitive potentiometer 88 comprises one component of a voltage divider network located in the throttle body 40 for controlling the electrical charge placed on capacitor 82. A rheostat 92 having the wiper contact connected to ground is coupled to the lower end of the pressure sensitive potentiometer 88. The purpose of the rheostat 92 is to provide an electrical analog which is a function of atmospheric pressure to provide an altitude compensation for engine operation at altitudes other than sea level. The rheostat 92 is variable to vary the voltage appearing at the wiper of potentiometer 88 for a fixed position thereof. Additionally, two series connected rheostats 94 and 96 are coupled to the other end of the potentiometer 88 by means of fixed resistance 98. An idle switch 100, shown in the normally closed position (N.C.) has its fixed contacts coupled across the combination of rheostats 94 and 96 while the movable contact is connected to the common connection therebetween. The A+ supply voltage from the supply bus 76 in the modulator 32 is coupled to the upper terminal of rheostat 96 by means of connector contacts 2 of connectors 43 and 45 and circuit lead 102. The rheostat 94 comprises a light load calibrating resistor while rheostat 96 comprises an idle resistor, and are manually adjusted to "tune up" the engine in the off idle and idle ranges of engine operation. Depending upon the position of the idle switch 100, which is mechanically coupled to and controlled by the throttle means, either rheostats 94 or 96 will be coupled into the voltage divider network. The voltage appearing at the wiper of potentiometer 88 then will be a function of the voltage drop across either rheostat 94 or 96, the fixed resistor 98, the resistance of the potentiometer 88, and the resistance of the rheostat 92. At sea level, the voltage across rheostat 92 is substantially zero with voltage drop increasing with increase in altitude (decreasing ambient air pressure). At high induction passage absolute pressures which occur at the wide open throttle (W.O.T.) position, the wiper of potentiometer 88 is substantially at zero or ground potential with the voltage increasing with decreasing absolute pressures.

As indicated above, the wiper of potentiometer 88 is coupled to capacitor 82 by means of the resistor 84. The opposite side of capacitor 82 is directly connected to the base of transistor $Q_2$ also shown as comprising a P-N-P transistor having its emitter directly connected to the A+ supply bus 76. The collector of transistor $Q_2$ is connected to the collector load resistor 104 which is returned to engine ground through connector contacts 10 of connector 45. Transistor $Q_2$ is operated in a normally saturated conductive state by returning the base to ground potential through the resistor combination comprising fixed resistor 106, rheostat 108, resistor 110, ambient air temperature thermistor 112 in the throttle body 40 and the engine block thermistor 114. Shunted across resistor 110, however, is transistor $Q_5$ which is illustrated as being a N-P-N transistor. Additionally, resistor 116 is commonly coupled to the collector of transistor $Q_5$ and the resistor 110. The other end of resistor 116 is connected to the positive supply bus 76. Transistor $Q_5$ is biased in a saturated conductive state by means of resistor 118 coupled to the base from the positive supply bus 76 and effectively removes resistor 110 from the network; however, during a period of acceleration, when enrichment is desired, transistor $Q_5$ is rendered non-conductive by means of the action of capacitor 120 to insert resistor 110 in the circuit. This action will be described in detail subsequently. Accordingly, resistors 106 and 108 and thermistors 112 and 114 normally provide the base current path for rendering the transistor $Q_2$ conductive to the point of saturation.

Thermistor 112 is a temperature responsive resistance element which changes as a function of the ambient air temperature while thermistor 114 is a temperature responsive element which is positioned on the engine block for providing a sensor which varies as a function of engine temperature. A fast idle heater 97 is connected in parallel with the voltage divider network comprising resistance elements 92 through 96 by means of wire 99 and connector contacts 8 of connector 43.

The operation of the modulator circuit 32 shown in FIGURE 2 is remotely similar to that described in the aforementioned U.S. Patent No. 3,032,025, granted to E. D. Long et al., wherein a capacitor charges and discharges in a collector coupled monostable multivibrator circuit. In the instant invention, however, capacitor 82 charges and discharges in a non-regenerative circuit. In operation, transistor $Q_1$ is normally non-conductive while transistor $Q_2$ is normally conductive in a saturated mode. Capacitor 82 charges to a voltage which is the difference between the positive A+ supply voltage appearing on the supply bus 76 and the voltage appearing at the wiper arm of potentiometer 88. The capacitor terminal common to junction 87 when fully charged is at the value of the A+ supply potential due to the fact that transistor $Q_2$ in its saturated mode acts substantially as a closed switch. The voltage appearing at the capacitor terminal which is common to junction 86 will be at the value of the voltage appearing at the wiper of potentiometer 86. At the instant that the trigger unit switch contacts 72 close due to action of the cam 70, transistor $Q_1$ is triggered on acting as a closed switch. When this occurs, the positive supply voltage A+ is coupled to terminal 86 through resistor 78 and depending on the voltage appearing at the wiper of potentiometer 88, the resultant voltage appears immediately at junction 87 due to the fact that the charge on a capacitor cannot change instantaneously. The value of this voltage is the difference between the positive supply potential A+ and the voltage appearing at the wiper arm of potentiometer 88. This change of potential at junction 87 is in a positive direction so as to render transistor $Q_2$ non-conductive or more simply turn it off. Capacitor 82 begins to discharge through the discharge path comprising fixed resistor 78, the conductive transistor $Q_1$, the fixed resistor 106, rheostat 108 and thermistors 112 and 114. As noted earlier, transistor $Q_5$ is normally conductive to provide a virtual short circuit across resistor 110. Therefore, it does not appear in the discharge path. As noted, however, it does have an effect when acceleration is desired and the wiper arm of potentiometer arm 88 is suddenly moved toward ground potential. This negative going voltage is coupled to the base of transistor $Q_5$ by means of capacitor 120 turning transistor $Q_5$ off. An open circuit across resistor 110 suddenly occurs to add an incremental resistance to the discharge time constant of capacitor 82. The RC time constant of capacitor 120 and resistor 118, however, is selected to add a 10% increment to the time constant and after a predetermined time extending over several engine cycles transistor $Q_5$ is again rendered conductive shorting resistor 110.

The collector of transistor $Q_2$ is either at the positive supply potential A+ when conductive or zero when it is non-conductive. The voltage waveform at junction 91 therefore will be a squarewave changing between the limits of zero and A+. Transistors $Q_3$ and $Q_4$ shown comprising P-N-P transistors are coupled in cascade to the collector of transistor $Q_2$ to provide an emitter follower stage for impedance matching purpose and an amplification stage, respectively, providing an output voltage comprising a squarewave at terminal 93 substantially identical to that appearing at junction 91. The squarewave output voltage appearing at terminal 93 comprises an energizing pulse of predetermined pulse width for operating the solenoids 101 of the eight fuel transducers 10. This pulse is applied via connector contacts 11 of connector 45 and resistor 103.

The pulse width of the squarewave appearing at terminal 93 is dependent on two factors. The first is the voltage appearing at the wiper of potentiometer 88 indicative of throttle position and the second is the discharge time constant of capacitor 82. This time constant is manually adjustable for engine tuning purposes by means of the rheostat 108. FIGURE 3 is an illustrative diagram of the manner in which the modulator 32 shown in FIGURE 2 operates to vary the pulse width of the energizing pulse applied to tthe eight fuel transducers 10. Curve $a$ is the waveform of the voltage appearing at terminal 87 when the wiper of the pressure sensor potentiometer 88 is in the "wide open throttle" position at sea level where the altitude compensator rheostat 92 provides zero resistance and the wiper is a ground potential. In this case, the voltage at junction 87 initially is at A+ potential but upon closure of the contacts 72 transistor $Q_1$ becomes conductive and the voltage at junction 87 immediately jumps to a value approaching 2A+. Transistor $Q_2$ turns off immediately and the voltage at junction 91 goes from A+ potential to zero potential while junction 93 goes from zero potential to A+ and remains at that potential for a time $t_1$ until capacitor 82 discharges to a point where transistor $Q_2$ again turns on and the voltage at terminal 87 returns to the A+ potential. The slope of the curve is dependent upon the time constant of the discharge circuit for capacitor 82.

For a throttle position less than "wide open throttle," the position of the wiper arm of potentiometer 88 will be at a voltage above ground potential so that the voltage at junction 86 does not rise to substantially twice the supply voltage as indicated in curve $b$ of FIGURE 3. Note, however, that the slope of the curve is the same as curve $a$ indicating that the time constant is the same. The pulse width of the energization pulse, however, at terminal 93 corresponds to $t_2$. When enrichment is necessary for acceleration, it is desirable that the energization pulse have a longer pulse width than normally required. This is provided by the action of transistor $Q_5$ turning off for a predetermined time as controlled by the RC time constant of capacitor 120 and resistor 118 to increase the RC discharge time of capacitor 82 as indicated by curve $c$ of FIGURE 3. In this instance, the pulse width of the energization pulse is extended to $t_3$. It should be noted that these curves have been exaggerated; however, this is done for purposes of illustration only.

Thus, the width of the energization pulse for the fuel transducers 10 is primarily controllable in accordance with the voltage appearing at the wiper of the pressure sensor potentiometer 88 and the discharge time constant of the capacitor 82. By use of the two position, double-throw idle switch 100, the pulse width is additionally varied for a curb idle and a light load condition. This is accomplished by varying the resistance in the voltage divider network. The two single-throw normally open switches 122 and 124 operate as a degaser switch and a deloader switch, respectively. Degaser switch 122 is adapted to be closed for example by the induction passage responsive piston, when the pressure has fallen below a predetermined value. Closure of switch 122 connects the positive supply bus 76 appearing at contacts 2 of connector 43 to the base of transistor $Q_1$ through contact 4 of connector 43 and diode 126 to prevent the closure of trigger switch contacts 72 from rendering transistor $Q_1$ conductive.

Should the engine become flooded during starting, the engine can be deloaded by means of switch 124. Switch 124 is adapted to be connected to the throttle and is closed when the throttle is at the extreme full throttle position. Closure of switch 124 couples the positive supply potential A+ connected to contact 7 of connector 43 to the base of transistor $Q_1$ through contacts 4 of connector 43 and diode 126. This also prevents transistor $Q_1$ from being triggered on when the switch contacts 72 of the trigger unit switch are closed.

Accordingly, the circuit configuration shown in FIGURE 2 discloses a non-regenerative type of modulator circuit for a precision fuel metering system whose fuel transducers are energized by means of a variable pulse width modulator having a capacitor charged to a predetermined potential dependent upon throttle position primarily and discharging upon closure of a pair of trigger unit switch contacts according to a selected time constant. Enrichment means are further provided to intermittently vary the time constant to further control the pulse width.

Referring now to FIGURE 4, a second throttle body unit configuration 128 is intended for use with the modulator unit 32 shown in FIGURE 2. Such a combination is desirable for example in marine engine applications where altitude compensation and a light load adjustment is unnecessary. The light load rheostat 94 shown in FIGURE 2 is omitted because it is well known that for marine engine applications, the engine is run at or near wide open throttle position for a large percentage of the running time. The throttle body unit 128 shown in FIGURE 4 includes a nine contact connector 130 coupled to connector 45. The throttle body unit further comprises an idle rheostat 96 coupled on one side to the positive supply bus A+ through contacts 2 of connector 130 and on the other side to the idle switch 100. A trimmer rheostat 132 which is located externally of the throttle body is connected to the idle switch 100 and rheostat 96 through contacts 8 and 9 of connector 130. The trimmer rheostat 132 may be located for example in the cockpit of a marine vessel to provide constant manual control by means of knob 134 which is mechanically connected to the wiper arm thereof. The idle switch 100 is located internally of the throttle body unit 128 and has its normally open contacts coupled across the connector contacts 8 and 9 of connector 130. The normally closed contacts are connected to a fast idle heater 97. A throttle potentiometer 89 having predetermined characteristics similar to that noted with respect to the pressure sensor potentiometer 88 in FIGURE 2 is connected in series to the trimmer rheostat 132 by means of the fixed resistor 98. A deloader switch 124 is coupled between contacts 4 and 7 of connector 130 in a normally open position as disclosed and explained with respect to FIGURE 2. The operation of the throttle body unit 128 is in every respect identical to the throttle body 40 shown in FIGURE 2 with the exception that the altitude compensator 92 is omitted and the manually remote trimmer rheostat 132 is included for maintaining a more precise control under operating conditions.

A second embodiment of the modulator unit is shown in FIGURE 5 for operation with a marine two-cycle engine. The modulator circuitry is generally designated by reference numeral 32A. A manual throttle control such as commonly utilized with marine apparatus is designated by reference numeral 136 and is mechanically coupled to the butterfly valve 137 of an air-intake port 138 on the throttle body unit 140 shown in cross section. An engine vacuum line 142 is coupled to the throttle body unit 140 in the vacuum side of the butterfly valve 137. A spring-biased plunger mechanism 144 is mechanically coupled to the wiper arm of the pressure sensor potentiometer 88A having electrical characteristics substantially the same as those described with respect to the modulator 32 in FIGURE 2. The potentiometer 88A forms a voltage divider with rheostat 96 which is adjustable to provide a manual idle adjustment. The A+ supply is connected to one side of the idle rheostat 96 while the one end of the rheostat 88 is returned to ground potential. Additionally, the wiper of potentiometer 88A is coupled to the collector of transistor $Q_1$ through fixed resistor 84. Capacitor 82 is connected to the common junction 86 between the collector of $Q_1$ and resistor 84. The base of transistor $Q_1$ is coupled to the A+ supply bus 76 by means of resistor 80 and resistor 74 is connected to the trigger switch contacts 72 through contacts 1 of connector 146. The other side of capacitor 82 is commonly connected to the base of transistor $Q_2$ and fixed resistor 106 at junction 87. Resistor 106 is fixed but is coupled in series to manually adjustable rheostat 108. The opposite terminal of rheostat 108 is connected to resistor 116 and contact 3 of connector 146. Contact 3 is connected to the grounded engine block thermistor 114. A fixed resistor 148 and diode 150 are coupled in series between contacts 2 and 3 of connector 146. Contact 2 of connector 146 is then coupled to one side of a starter solenoid 66 which is common to the start section of the ignition switch 48 so that upon starting battery supply voltage is applied to the engine block thermistor 114. The resistor combination of resistor 106, rheostat 108 and the thermistor 114 provides a base current path for maintaining transistor $Q_2$ conductive in a normally saturated state in the same manner as $Q_2$ of the modulator 32 shown in FIGURE 2. Transistors $Q_3$ and $Q_4$ again provide an emitter follower and an amplification stage, respectively, for the signal which appears at the collector of transistor $Q_2$ (junction 91). The collector of transistor $Q_4$ is coupled to four fuel transducer solenoids 150 through contact 4 of connector 146. Contact 6 of connector 146 provides a common ground connection to the engine block and contact 7 is used to couple the A+ supply voltage to the fuel pump 24 when it is applied to contact 5 through switch 48.

The operation of the embodiment of FIGURE 5 is the same as the configuration shown in FIGURE 2, the difference being that in the present embodiment the electrical components affecting the control of the pulse width of the energizing pulse coupled to the fuel transducers is reduced in number and are consolidated primarily within a single unit. Transistor $Q_2$ is normally conductive and capacitor 82 charges to a voltage which is the difference between the A+ supply and the voltage appearing at the wiper of potentiometer 88A. The wiper is mechanically driven in response to engine vacuum pressure which is made to vary in response to the position of the throttle control 136. During each revolution of the engine, the trigger unit switch contacts 72 closes returning resistor 74 to ground causing transistor $Q_1$ to become conductive and act as a closed switch. This action immediately couples a positive voltage greater than the supply voltage A+ to junction 87 which is the base of transistor $Q_2$ turning it off. Capacitor 82 begins to discharge according to the time constant including capacitor 82, resistor 106, rheostat 108 and the thermistor 114. When capacitor 82 discharges a predetermined amount, the voltage appearing at the base of transistor $Q_2$ will be of a sufficient magnitude to allow base current to flow into the transistor $Q_2$ once again turning it on. When transistor $Q_2$ becomes conductive, capacitor 82 ceases to discharge and recharges until transistor $Q_1$ again is triggered conductive at its designated time during the next engine cycle. The signal at the collector of transistor $Q_2$ (junction 91) is a squarewave having a pulse width variable in accordance with the voltage appearing at the wiper of potentiometer 88A and the discharge time constant of capacitor 82. Accordingly, the pulse width of the energizing pulse coupled from transistor $Q_4$ to the transducer solenoids 150 are of a proper width to energize fuel transducers for an optimum time to provide a predetermined charge of fuel to each of the engine cylinders during each cycle of the engine operation.

What has been shown and described therefore is a non-regenerative modulator circuit and an enrichment circuit combined therewith for providing control of the energizing pulse width for fuel metering transducers for a relatively wide range as a function of engine operating conditions but wherein the pulse width remains substantially constant for a fixed engine speed with other engine operating conditions being constant.

What is claimed is:
1. A non-regenerative modulator circuit for generating a variable pulsewidth energizing pulse to control the energization time of electrical fuel metering transducer means for an internal combustion engine comprising in combination:
   a source of electrical supply voltage;
   switch means coupled to said source of supply voltage being responsive to engine speed to be rendered electrically conductive for a predetermined time during each engine cycle;
   a first transistor having a base, an emitter, and a collector, coupled to said source of supply voltage including variable resistance means coupled to said base for biasing said transistor in a normally conductive state of operation;
   a voltage divider network coupled to said source of supply voltage including a potentiometer responsive to changes in power demand from the engine and having a wiper contact whose position and voltage appearing thereat is variable in accordance with said changes in power demand;
   single circuit means, including at least one capacitor coupled between said switch means and said first transistor, whereby the operation of said first transistor is responsive to the operation of said switch means but the operation of said switch means is un- responsive to the operation of said first transistor, said at least one capacitor having one side thereof commonly coupled to said switch means and said wiper contact arm of said potentiometer forming a first junction and having the other side thereof coupled to the base of said first transistor and said variable resistance means forming a second junction, said at least one capacitor being operable to be charged through said first transistor when said switch means is non-conductive to a voltage which is substantially equal to the magnitude of said supply voltage less the magnitude of the voltage at said wiper contact arm but when said switch means is rendered electrically conductive said supply voltage is additionally applied to said one side of said capacitor and said first transistor is driven non-conductive thereby due to the fact that the charge on said capacitor cannot change instantaneously and said capacitor then discharges at a predetermined rate as a function of the value of said capacitor and said variable resistance means through said switch means and said variable resistance means until the voltage at said base is at a level sufficient to cause said transistor to again become conductive; and output circuit means coupled to said first transistor for coupling a signal to said fuel metering transducer means produced in accordance with the operation of said first transistor as a result of the voltage to which said capacitor charges and discharges.

2. A non-regenerative modulator circuit for generating a variable pulsewidth energizing pulse to control the energization time of electrical fuel metering transducer means for an internal combustion engine comprising in combination:

a source of electrical supply voltage;

switch means coupled to said source of supply voltage being responsive to engine speed to be rendered electrically conductive for a predetermined time during each engine cycle;

a first transistor having a base, an emitter, and a collector, coupled to said source of supply voltage including variable resistance means coupled to said base for biasing said transistor in a normally conductive state of operation;

a voltage divider network coupled to said source of supply voltage including a potentiometer responsive to changes in power demand from the engine and having a wiper contact whose position and voltage appearing thereat is variable in accordance with said changes in power demand;

circuit means including at least one capacitor having one side thereof commonly coupled to said switch means and said wiper contact arm of said potentiometer forming a first junction and having the other side thereof coupled to the base of said first transistor and said variable resistance means forming a second junction, said capacitor being operable to be charged through said first transistor when said switch means is non-conductive to a voltage which is substantially equal to the magnitude of said supply voltage less the magnitude of the voltage at said wiper contact arm but when said switch means is rendered electrically conductive said supply voltage is additionally applied to said one side of said capacitor and said first transistor is driven non-conductive thereby due to the fact that the charge on said capacitor cannot change instantaneously and said capacitor then discharges at a predetermined rate as a function of the value of said capacitance and said variable resistance means through said switch means and said variable resistance means until the voltage at the base of said first transistor is at a level sufficient to cause said first transistor to again become conductive, said circuit means including at least one capacitor being the only circuit means coupled between said switch means and said first transistor, the operation of said first transistor being responsive to the operation of said switch means but the operation of said switch means being unresponsive to the operation of said first transistor; and output circuit means coupled to said first transistor for coupling a signal to said fuel metering transducer means produced in accordance with the operation of said first transistor as a result of the voltage to which said capacitor charges and discharges.

3. A non-regenerative modulator circuit for generating a variable pulse width energizing pulse to control the energization time of electrical fuel metering transducer means for an internal combustion engine comprising in combination:

a source of electrical supply voltage;

switch means coupled to said source of supply voltage, being responsive to engine speed to be rendered electrically conductive for a predetermined time during each engine cycle;

a first transistor having a base, an emitter, and a collector, coupled to said source of supply voltage including variable resistance means coupled to said base for biasing said transistor in a normally conductive state of operation;

a voltage divider network coupled to said source of supply voltage including a potentiometer responsive to changes in power demand from the engine and having a wiper contact whose position and voltage appearing thereat is variable in accordance therewith;

a capacitor having one side thereof commonly coupled to said switch means and said wiper contact arm of said potentiometer forming a first junction and having the other side thereof coupled to the base of said first transistor and said variable resistance means forming a second junction, said capacitor being operable to be charged through said first transistor when said switch means is non-conductive to a voltage which is substantially equal to the magnitude of said supply voltage less the magnitude of the voltage at said wiper contact but when said switch means is rendered electrically conductive said supply voltage is additionally applied to said one side of said capacitor and said transistor is driven non-conductive thereby due to the fact that the charge on said capacitor cannot charge instantaneously and said capacitor then discharges at a predetermined rate as a function of the valve of said capacitance and said variable resistance means through said switch means and said variable resistance means until the voltage at said base is at a level sufficient to cause said transistor to again become conductive, said capacitor being the only element coupled between said switch means and said first transistor; and output circuit means coupled to said first transistor for coupling a signal to said fuel metering transducer means produced in accordance with the operation of said first transistor as a result of the voltage to which said capacitor charges and discharges.

4. The invention as defined by claim 1 wherein said switch means comprises a mechanically actuated trigger unit switch having a pair of movable electrical contacts, a second transistor having a base, an emitter and a collector coupled to said source of voltage supply, and circuit means coupling said pair of electrical contacts to the base of said second transistor, including first bias means for supplying a base current to said transistor for being rendered conductive upon closure of said switch contacts.

5. The invention as defined by claim 1 wherein said variable resistance means coupled to said base of said first transistor comprises a plurality of resistance elements coupled together in series and a third transistor including a collector-emitter junction, said junction being shunted across one of said plurality of resistance elements including resistive bias means coupled to said source of supply voltage for maintaining said third transistor in a normally conductive state of operation thereby maintaining said one resistance element in a normally short cricuited condition, and capacitive coupling means coupling said wiper contact of said voltage divider network to said third transistor making said third transistor responsive to negative going changes of potential of said potentiometer for rendering said transistor intermittently non-conductive for a predetermined time thereby increasing the discharge time constant of said capacitor to increase the pulse width of said energizing pulse.

6. The invention as defined by claim 5 wherein said first and second tarnsistors are comprised of transistors having a first type of conductivity and said third transistor is comprised of a transistor having a second type of conductivity.

7. The invention as defined by claim 5 wherein said third transistor includes a base, an emitter and a collector and additionally including circuit means for connecting the collector and emitter of said third transistor across said one resistance element and wherein said resistive bias means coupled to said base includes a resistance of a predetermined value and said capacitive coupling means comprises a capacitor coupled from said base to said wiper arm and wherein said resistance and said capacitor exhibit a predetermined RC time constant for maintaining said transistor in a non-conductive state for a predetermined time when said third transistor is rendered non-conductive.

8. The invention as defined by claim 7 wherein said resistor and said capacitor are of a selected value to have a predetermined RC time constant to maintain said third transistor in a non-conductive state for a period greater than one engine cycle.

9. The invention as defined by claim 1 wherein said first transistor comprises a transistor of a first type of conductivity and additionally including circuit means for directly connecting the emitter thereof to said source of supply voltage, the collector thereof to said output circuit means, and wherein said variable resistance means comprises a plurality of resistance elements with at least one of said plurality of resistance elements being responsive to engine operating conditions and wherein at least one of said resistance elements comprises a variable resistance for selectively adjusting the discharge time constant of said capacitor for constant engine operating conditions.

10. The invention as defined by claim 1 and additionally including a device responsive to engine vacuum pressure and wherein said wiper contact of said potentiometer includes means for being mechanically coupled to said device responsive to engine vacuum pressure.

11. The invention as defined by claim 1 wherein said output circuit means comprises at least a fourth transistor having a base, an emitter and a collector and additionally including circuit means for coupling the collector of said first transistor to the base of said fourth transistor and circuit means coupling the collector of said fourth transistor to said fuel metering transducer means.

12. The invention as defined by claim 1 wherein said switch means includes: a transistor having an input and an output electrode; circuit means coupling said output electrode to said one side of said capacitor; and circuit means coupled to said input electrode for rendering said transistor selectively conductive and non-conductive for a predetermined time during each engine cycle.

13. The invention as defined by claim 1 wherein said switch means includes: a transistor having an input and an output electrode; circuit means coupling said output electrode to said one side of said capacitor; and circuit means coupled to said input electrode for rendering said transistor selectively conductive and non-conductive for a pretermined time during each engine cycle.

References Cited

UNITED STATES PATENTS 3,032,025  5/1962  Long et al.

LAURENCE M. GOODRIDGE, Primary Examiner

U.S. Cl. X.R.

123—119, 139